US007274924B2

(12) United States Patent
Yoshioka

(10) Patent No.: US 7,274,924 B2
(45) Date of Patent: Sep. 25, 2007

(54) EMERGENCY REPORT TERMINAL DEVICE AND SYSTEM

(75) Inventor: Kenji Yoshioka, Yokohama (JP)

(73) Assignee: Matsushita Electric Industrial Co., Ltd., Kadoma-Shi, Osaka (JP)

( * ) Notice: Subject to any disclaimer, the term of this patent is extended or adjusted under 35 U.S.C. 154(b) by 573 days.

(21) Appl. No.: 10/758,221

(22) Filed: Jan. 16, 2004

(65) Prior Publication Data

US 2004/0166828 A1 Aug. 26, 2004

(30) Foreign Application Priority Data

Jan. 24, 2003 (JP) ............................ 2003-015741

(51) Int. Cl.
*H04M 11/04* (2006.01)

(52) U.S. Cl. .................................... 455/404.1; 455/345

(58) Field of Classification Search ............. 455/404.1, 455/344, 345, 569.1, 569.2
See application file for complete search history.

(56) References Cited

U.S. PATENT DOCUMENTS 6,792,296 B1 * 9/2004 Van Bosch .............. 455/569.2
6,980,092 B2 * 12/2005 Turnbull et al. ......... 340/425.5
2002/0137489 A1 * 9/2002 Dutta et al. ................. 455/404
2004/0142678 A1 * 7/2004 Krasner ................... 455/404.2
2006/0172717 A1 * 8/2006 DeLine et al. ........... 455/226.4

* cited by examiner

*Primary Examiner*—Sanh D. Phu
(74) *Attorney, Agent, or Firm*—Manabu Kanesaka

(57) ABSTRACT

A structure of a wireless communication device for calling an emergency report center via a cellular phone network is simplified. Further, provision is made so that voice communication can be established with the emergency report center from anywhere. To provide such an advantage, a built-in wireless communication section is used to transmit data, including a phone number of a cellular phone possessed by a user in a vehicle when an emergency report is made to the emergency report center via the cellular phone network. An operator in the emergency report center uses the phone number of the cellular phone to establish voice communication with the user. Since the built-in wireless communication section does not require a voice communication circuit, the wireless communication device structure can be simplified to reduce a size and cost of the device. Further, the emergency report center can establish voice communication with the user even when the user has to stay away from the vehicle depending on a situation.

5 Claims, 3 Drawing Sheets

EMERGENCY REPORT TERMINAL DEVICE AND SYSTEM

BACKGROUND OF THE INVENTION

1. Field of the Invention

The present invention relates to an on-vehicle emergency report terminal device and system for placing a phone call in an emergency to an emergency report center via a cellular phone network in order to transfer the positional information about the call originator's vehicle and establish voice communication to convey the information about the emergency.

2. Description of the Related Art

A previously known, on-vehicle emergency report terminal device is used in the event of a traffic accident or sudden illness to place a phone call via a cellular phone network to an emergency report center automatically or by performing a simple manual operating procedure, transfer positional information, and request a police, fire department, or other emergency vehicle. When such an emergency report terminal device is used, the user can establish voice communication with the emergency report center through the use of a cellular phone and convey the information about the accident. The technology used for the above operation is disclosed, for instance, by Japanese Published Unexamined Patent Application No. 2002-187510.

In the event of a traffic accident, sudden illness, or other emergency, the conventional emergency report terminal device established a telephone line connection by originating a call via a cellular phone line. When the telephone line connection was established, the conventional emergency report terminal device performed a data communication process by transmitting the vehicle's unique number, the emergency report terminal device's unique number, the current positional information, the date/time of current positional information acquisition, the information about the route traveled by the vehicle, the dates/times of traveled route point recordings, the cause of triggering an emergency report communication process, and the phone number (local phone number) of the cellular phone used for telephone call origination. The local phone number is phone number data that the emergency report terminal device acquired from the cellular phone by issuing a local phone number request to the cellular phone. The emergency report center performed an emergency report communication process, for instance, by acquiring the positional information from the emergency report terminal device, and then disconnected the line. If it was necessary to talk with the vehicle's user who performed the emergency report communication process after line disconnection, the emergency report center called the local phone number of the cellular phone, which was transmitted at the time of data communication, and established a voice call line connection to obtain the information about the current situation. When the emergency report system described above was used after line disconnection to acquire the information about the situation or request any additional information, it was able to originate a call to establish voice communication and collect additional information because it knew the local phone number of the cellular phone used for reporting.

However, the emergency report terminal device for the conventional emergency report system performed an emergency report communication process by use of a cellular phone that was built in the emergency report terminal device. Therefore, a wireless communication device was required as a cellular phone that was capable of establishing data communication and performing a voice communication process. In addition, it was necessary to use an incoming voice channel for outputting the voice from the cellular phone to a loudspeaker and an outgoing voice channel for outputting the voice picked up by a microphone to the cellular phone. Further, if handsfree voice communication was to be effected, the use of an echo cancel circuit or other voice circuit was needed. The use of such a voice communication circuit enlarged the size of the emergency report terminal device and incurred an increase in the cost. In addition, in a situation where a contract was signed with a communications provider who provided telephone line connection for cellular phones, the service for providing both the data communication and voice communication functions was more expensive than the service for providing a data communication process only. That was why the widespread use of the emergency report system was discouraged. Further, since the cellular phone built in the emergency report terminal device was used for voice communication, the user had to stay in the vehicle to maintain voice communication. If the user left the vehicle that was endangered, the user could not maintain voice communication.

The present invention has been made to solve the foregoing conventional problems, and provides an emergency report terminal device and system for simplifying the structure of a wireless communication device that calls an emergency report center in an emergency report system and enabling the user to maintain voice communication with the emergency report center even when the user has to stay away from the user's vehicle.

SUMMARY OF THE INVENTION

To achieve the abovementioned object, the emergency report terminal device according to the present invention, which is mounted in a vehicle, calls an emergency report center via a cellular phone network by performing an emergency report communication process in the event of an emergency, transfers positional information about the vehicle, and establishes voice communication to convey the information about the emergency. This emergency report terminal device includes built-in wireless communication means for performing the emergency report communication process and control means for transmitting a phone number of a cellular phone to the emergency report center when data is transmitted by the built-in wireless communication means. Due to this configuration, the wireless communication means built in the emergency report terminal device need not be equipped with a voice communication circuit. Since the wireless communication means is simplified in this manner, it is possible to reduce the size and cost of the emergency report terminal device. In addition, the contract to be signed with a cellular phone communications provider can be limited to a data communication process. As a result, the basic charge to be paid to the communications provider is lower than in a case where voice communication is provided. Further, the emergency report center knows the phone number of a cellular phone possessed by the user, and can therefore communicate with the user even when the user is away from the vehicle.

The emergency report terminal device according to the present invention also transfers to the emergency report center the data including the vehicle's unique number, the emergency report terminal device's unique number, the current positional information, date/time of acquisition of the current positional information, information about a route traveled by the vehicle, dates/times of traveled route point recordings, and information about one or more causes of triggering an emergency report communication process. The use of this configuration not only provides the foregoing advantage but also enables the emergency report center to acquire the information about an accident.

In addition, the emergency report terminal device according to the present invention includes operating input means for acquiring the phone number of the above-mentioned cellular phone. The use of this configuration not only allows the emergency report terminal device to immediately transmit the phone number of the cellular phone to the emergency report center in the event of an emergency, but also enables the emergency report center to use the phone number of the cellular phone for the purpose of directly contacting the user when it is necessary to talk with the user to grasp the situation.

Further, the emergency report terminal device according to the present invention includes means for acquiring the phone number of the cellular phone when the cellular phone is connected to the emergency report terminal device. The use of this configuration not only enables the emergency report terminal device to acquire the phone number of the user's cellular phone, but also makes it possible to immediately transmit the phone number of the cellular phone to the emergency report center in the event of an emergency. As a result, the emergency report center can acquire the phone number of the cellular phone and directly contact the user when it is necessary to talk with the user to grasp the situation.

Furthermore, the emergency report terminal device according to the present invention includes means for notifying a user of inability to acquire the cellular phone number of the cellular phone when the phone number of the cellular phone cannot be acquired. The use of this configuration can not only prevent the user from forgetting to register the cellular phone number but also prompt the user to properly register the user's cellular phone number.

Moreover, the present invention is an emergency report system in which the emergency report terminal device mounted in a vehicle performs an emergency report communication process via a cellular phone network to call an emergency report center in the event of an emergency, transfer positional information about the vehicle, and establish voice communication to convey the information about the emergency. The emergency report terminal device includes built-in wireless communication means for performing the emergency report communication process and control means for transmitting a phone number of a cellular phone possessed by a user in the vehicle to the emergency report center when data is transmitted by the built-in wireless communication means. The emergency report center uses the phone number of the cellular phone, which is transmitted from the emergency report terminal device, to place a call to the user and establishes voice communication to obtain the information about a situation in which an emergency report has been made. The use of this configuration obviates the necessity for adding a voice communication circuit to the wireless communication means built in the emergency report terminal device. Due to the use of simple wireless communication means, it is possible to reduce the size and cost of the emergency report terminal device. Further, when the contract to be signed with a cellular phone communications provider is limited to a data communication process, the basic charge to be paid to the communications provider is lower than in a case where voice communication is provided. Furthermore, the emergency report center knows the phone number of a cellular phone possessed by the user, and can therefore communicate with the user even when the user is away from the vehicle.

As described above, the emergency report terminal device according to the present invention is mounted in a vehicle to perform an emergency report communication process in the event of an emergency to transmit the positional information about the vehicle to the emergency report center via a cellular phone network, and establish voice communication to convey the information about the encountered emergency situation. The emergency report terminal device includes built-in wireless communication means for performing the emergency report communication process and control means for transmitting the phone number of the cellular phone possessed by the user in the vehicle to the emergency report center when data is transmitted by the built-in wireless communication means. The use of the above configuration obviates the necessity for adding a voice communication circuit to the wireless communication means built in the emergency report terminal device. Since the wireless communication means is simplified in this manner, it is possible to reduce the size and cost of the emergency report terminal device. Further, when the contract to be signed with a cellular phone communications provider is limited to a data communication process, the basic charge to be paid to the communications provider is lower than in a case where voice communication is provided. Furthermore, even when the vehicle from which an emergency report has been issued is endangered and the user has to stay away from the vehicle, an excellent advantage provided by the present invention makes it possible to establish proper voice communication between the user and the emergency report center.

The foregoing objects and advantages of the present invention will be apparent from the following more particular description of a preferred embodiment of the invention, as illustrated in the accompanying drawings.

DESCRIPTION OF THE PREFERRED EMBODIMENT

Figure 1:
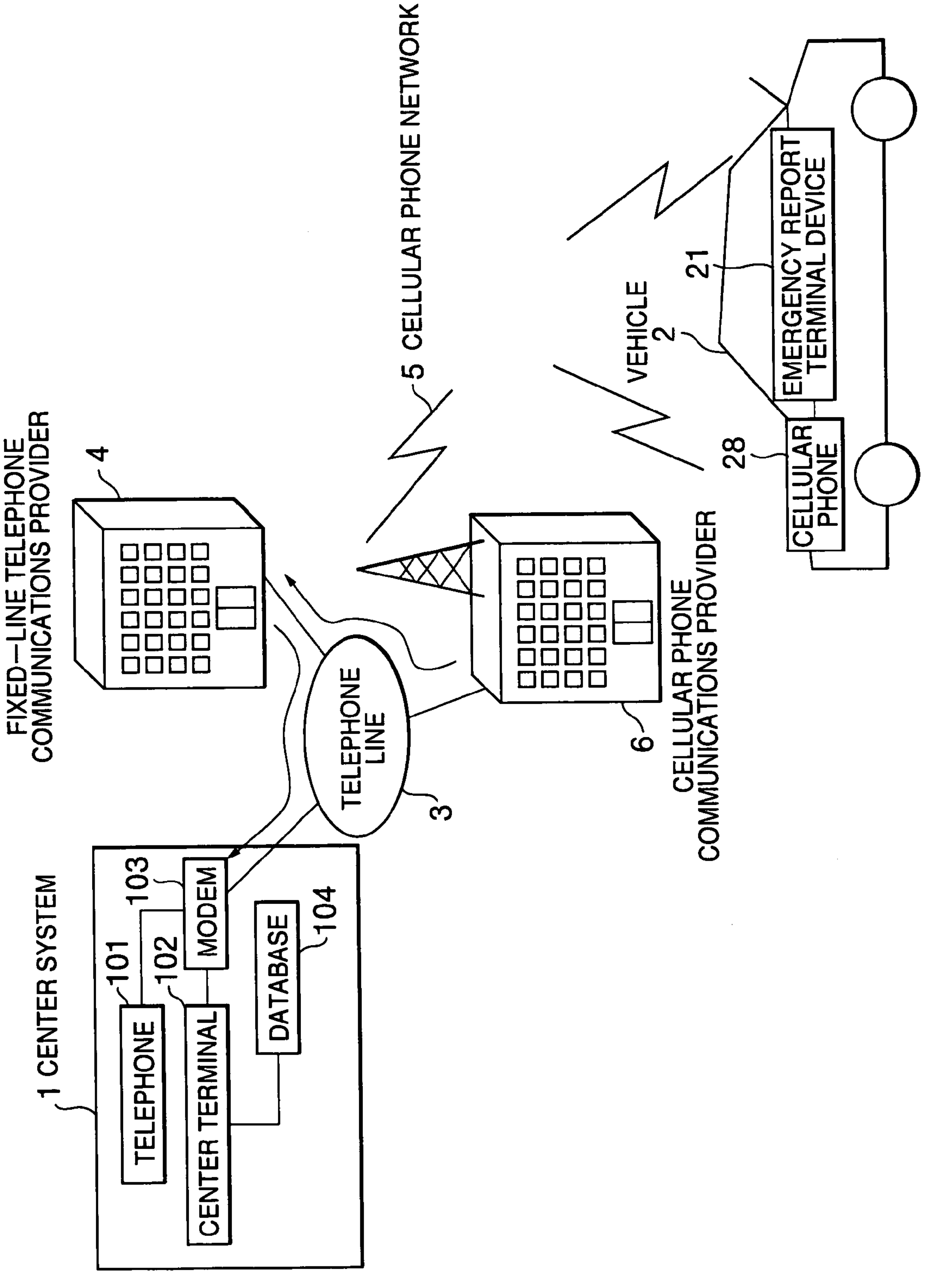
FIG. 1 is a block diagram illustrating the configuration of an emergency report system according to one embodiment of the present invention.

One embodiment of the present invention will now be described with reference to the accompanying drawings. FIG. 1 illustrates the configuration of an emergency report system according to the present embodiment. The emergency report system includes a center system 1, an emergency report terminal device 21, which is mounted in a vehicle 2, and a cellular phone 28, which is possessed by a user in the vehicle 2. A fixed-line telephone communications provider 4 who operates and manages a telephone line 3 and a cellular phone communications provider 6 who operates and manages a cellular phone network 5 are involved in the operation of the emergency report system.

The center system 1 shown in FIG. 1 is an emergency report center that manages an emergency report communication process. The emergency report communication process, which uses a wireless communication device separate from the cellular phone 28, is performed by the emergency report terminal device 21. Thanks to the emergency report communication process performed by the emergency report terminal device 21, relevant information including the unique information about the vehicle 2 and the information about the user is obtained to confirm that the user is registered with the emergency report system. Further, the positional information transmitted from the vehicle 2 identifies the location at which the emergency report communication process was performed. In addition, the phone number of the user's cellular phone 28, which is transmitted from the vehicle 2, is acquired to establish voice communication via the cellular phone 28 for the purpose of obtaining the information about the emergency situation that the user is in. As a result, the information about an accident is obtained to transmit an appropriate rescue request to a police department, fire department, or other rescue organization. The cellular phone communications provider 6 provides and operates a cellular phone service. More specifically, the cellular phone communications provider 6 dials a call from the cellular phone to a target telephone terminal or from the target telephone terminal to the cellular phone to establish a connection to the cellular phone network 5, and provides a service for distributing data and establishing voice communication. The fixed-line telephone communications provider 4 provides and operates a telephone call service. More specifically, the fixed-line telephone communications provider 4 establishes a line connection by dialing a call from a certain telephone terminal or the telephone line 3 to a target telephone terminal, and provides a service for data distribution and voice communication.

In the center system 1, the telephone 101 is a device that uses the telephone line 3 to dial a call or receive an incoming call and establishes voice communication with the telephone line 3 connected. Upon receipt of an emergency report communication, the operator of the center system 1 acquires the phone number of the user's cellular phone 28, which is transmitted from the emergency report terminal device 21, and performs a dialing process with the telephone 101 to call the user's cellular phone 28. The operator of the center system 1 can obtain the information about the accident, personal injury, and property damage by establishing voice communication with the user via the cellular phone 28. The center terminal 102 is an operating control terminal device for operating the center system 1. In response to an emergency report call process that the emergency report terminal device 21 performed using a wireless communication device other than the cellular phone 28, the center terminal 102 performs an incoming call/telephone line connection process, plots the vehicle's location on an electronic map in accordance with the positional information, which is transmitted from the emergency report terminal device 21 at the time of line connection establishment, and conveys the vehicle's positional information to the operator who operates the center terminal 102. The modem 103 is a communication device for performing a data modulation/demodulation process and establishing data communication via the telephone line 3. The database 104 is a storage device for storing nationwide electronic map information as well as the information about subscribers to a service operated by the center system 1. The stored subscriber information indicates the relationship between a vehicle registration number, which is transmitted from the vehicle 2, and the vehicle type, vehicle color, registrant, and other relevant information. When an incoming call is from a registered emergency report terminal device 21, the databased information can be searched in accordance with the device's registration number to retrieve the associated information including the vehicle's registration number, vehicle type, vehicle color, and registrant.

Figure 2:
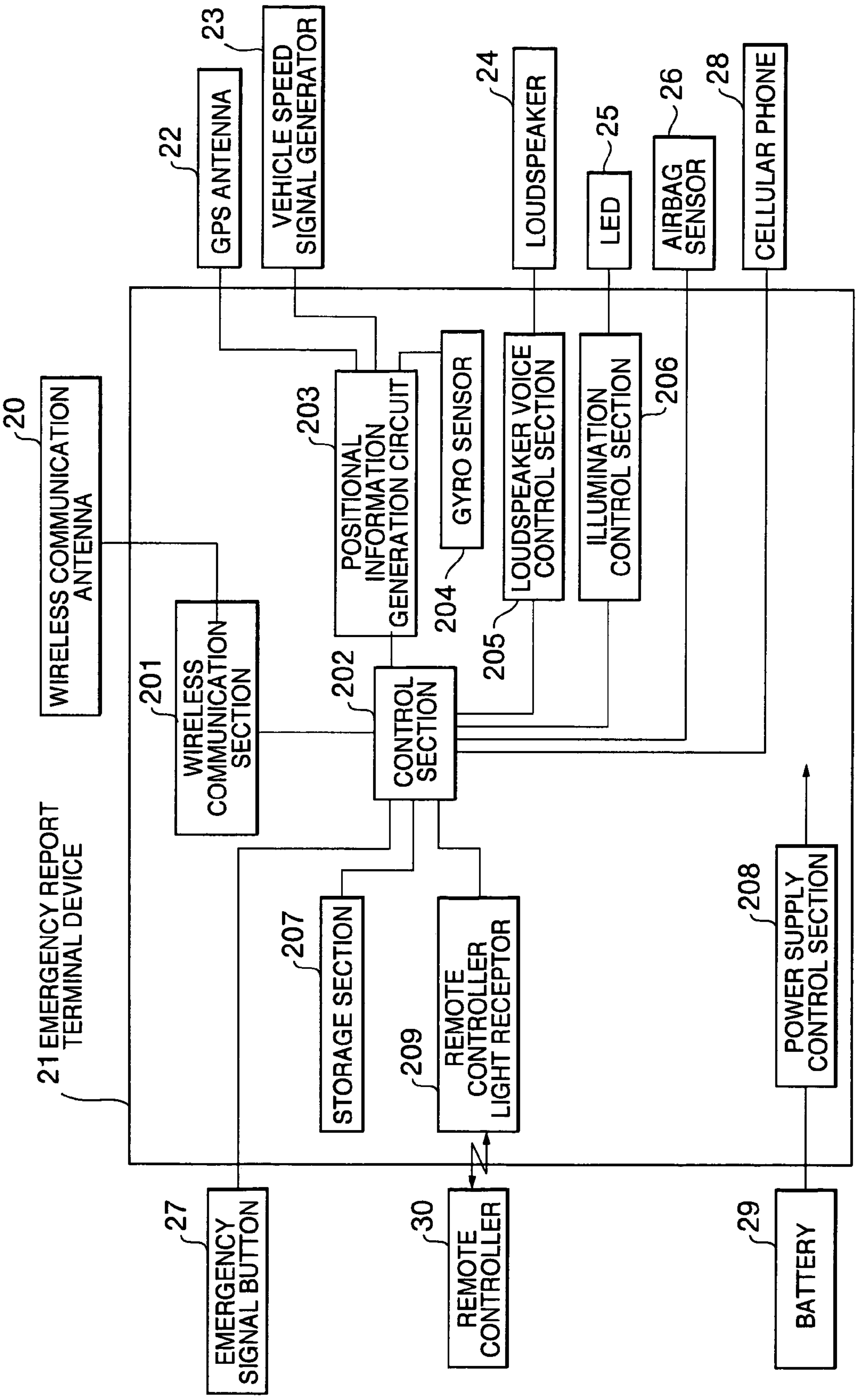
FIG. 2 is a block diagram illustrating the configuration of an emergency report terminal device according to the above embodiment.

FIG. 2 illustrates the configuration of the emergency report terminal device 21 according to the present embodiment. When an airbag built in the vehicle 2 inflates due, for instance, to a traffic accident or an emergency signal button in the vehicle 2 is pressed in the event of the user's sudden illness, the emergency report terminal device 21 performs an emergency report communication process in relation to the center system 1 and transmits relevant information such as the positional and other information about the vehicle 2. The cellular phone 28 is a mobile phone terminal device that is not only used by the user for ordinary purposes, but also used to establish voice communication during the emergency report communication process. The phone number of the cellular phone 28 is acquired when the user operates a remote controller 30 to enter the phone number or automatically acquired when the cellular phone 28 is connected to the emergency report terminal device 21 via a wireless or hard-wired circuit. In the latter case, cellular phone number acquisition takes place when the emergency report terminal device 21 transmits a local phone number request signal and the cellular phone 28 transmits its local phone number in response to the request signal. When a hard-wired connection is used, the asynchronous serial signal is generally used.

The wireless communication antenna 20 is a transmission/reception antenna that provides radio signal transmission/reception when a wireless communication section 201 performs a telephone transmission/reception process. The GPS antenna 22 receives information that is transmitted from a GPS (Global Positioning System) satellite. The vehicle speed signal generator 23 calculates the current vehicle speed in accordance with a signal output from a wheel-mounted sensor, which transmits the number of revolutions per unit time, wheel diameter, and other information. A pulse sensor is mounted on the vehicle's wheel. A pulse is generated whenever the wheel rotates by a predefined amount. The distance traveled can be calculated from the number of generated pulses, that is, the number of revolutions per unit time. The vehicle speed can be calculated from the number of revolutions per unit time. The loudspeaker 24 is a device that receives an electrical signal input and then converts it to a sound by vibrating the air. The LED 25 includes a light-emitting diode and emits a green, red, or other light depending on the employed substance. The characteristics of the LED are utilized so that the LED conveys the status information about the emergency report terminal device 21 to the user. The airbag sensor 26 is an impact sensor, which outputs a control signal for inflating the airbag when it detects an impact (acceleration) greater than predefined. The emergency signal button 27 is to be pressed when, for instance, the user needs a rescue organization's rescue due to a sudden illness. When the emergency signal button 27 is pressed, the emergency report terminal device 21 senses such a press and proceeds to perform an emergency report communication process. In general, the signal output from the emergency signal button 27 is either Low or High so that the ON or OFF state is detected. Different midpoint voltages are generated depending on whether the emergency signal button 27 is pressed or not. Therefore, if a voltage other than the midpoint voltages is generated due, for instance, to a short or open, it can be concluded that an abnormality exists. Consequently, it is possible to incorporate a function for detecting a failure in the emergency signal button 27. The battery 29 is a storage battery that supplies power to various components of the vehicle. While the vehicle is running the engine, the alternator charges the battery 29. Therefore, the battery 29 can continuously supply power to the vehicle. The remote controller 30 is equipped with numeric keys for phone number input as well as some other operating control keys. It uses infrared rays to transmit signals. The remote controller light receptor 209 receives infrared signals from the remote controller 30 and can register the phone number of the cellular phone 28 in a storage section 207 via a control section 202.

The wireless communication section 201 is a wireless communication device that is built in the emergency report terminal device 21, which uses a cellular phone network. The wireless communication section 201 dials a call to the center system 1 at the time of an emergency report communication process. When a telephone line connection is established, the wireless communication section 201 performs a data communication process to transmit the information about the vehicle 2. Some recently used mobile wireless communication devices provide both voice communication and data communication while the others provide data communication only. Since the latter type, which provides data communication only, is without a voice circuit, it is relatively small in size and at an advantage in that the communication service charge is low. The wireless communication section 201 according to the present embodiment is of the latter type.

The control section 202 is a control circuit that provides overall control over the emergency report terminal device 21. The control section 202 mainly includes a CPU. Upon receipt of a signal indicating the inflation of the airbag from the airbag sensor 26 or the press of the emergency signal button 27, the control section 202 performs an emergency report communication process. The emergency report communication process exercises line connection control over the wireless communication section 201. When the line connection is established, the emergency report communication process exercises control for transmitting the vehicle information and the local phone number information, which is fed from the cellular phone 28, to the center system 1.

A positional information generation circuit 203 is a computation circuit that acquires various items of information including satellite information from the GPS antenna 22, speed information from the vehicle speed signal generator 23, and angular speed information from a gyro sensor 204, and performs a process for calculating the current location. The gyro sensor 204 is a sensor that calculates the angular speed. A loudspeaker sound control section 205 is an audio playback circuit that includes an audio playback ROM, which outputs a signal for ensuring that a preset message is heard on the loudspeaker 24, and a loudspeaker amplifier. The audio data about audible preset messages are recorded beforehand in the loudspeaker sound control section 205. In compliance with the instructions issued by the control section 202, the loudspeaker sound control section 205 performs a process for generating an audible preset message for the purpose of conveying the emergency report state, failure state, and other status information about the emergency report terminal device 21 to the user. An illumination control section 206 is a control circuit that exercises illumination/extinguishment control over the LED 25. The LED 25 illuminates when a predefined voltage is applied to it. When an illumination control signal is entered under control of the control section 202, the illumination control section 206 illuminates the LED 25 by applying a predefined voltage to it. The storage section 207 is a memory device that records various items of information including the operation/failure status information about the emergency report terminal device 21 and the information required for CPU control. This memory device includes a flash memory or other nonvolatile memory and an SRAM or other volatile memory. The storage section 207 stores not only a CPU control program and variables necessary for program startup, but also various other items of information such as the positional information about the vehicle 2, which is collected on a periodic basis, the phone number acquired from the user's cellular phone 28, and the communication history of emergency report communication process executions relative to the center system 1. Since the history of information receptions and other communications is stored in the nonvolatile memory, it is retained even after the storage section 207 is removed from the vehicle with the power supply shutoff. Therefore, it can be effectively used, for instance, for future information analysis. The power supply control section 208 generates power supply voltages necessary for the control section 202 and other circuits from the power supplied from the battery 29, and performs a power supply operation.

The operation performed in the present embodiment will now be described with reference to FIGS. 1 and 2. As indicated in FIG. 2, the battery 29 supplies power to the emergency report terminal device 21 as well as the other electrical devices in the vehicle. The power supply control section 208 receives a power supply voltage from the battery 29, lowers it to the operating voltages for the internal circuits of the emergency report terminal device 21, and supplies such lowered voltages to the internal circuits. The person in the vehicle first transmits the phone number of his/her cellular phone to the remote controller light receptor 209 by operating the remote controller 30. The control section 202 then registers the phone number in the storage section 207. An alternative is to establish a hard-wired or wireless connection, as described later, between the cellular phone 28 and control section 202 and perform a communication process between them to register the phone number in the storage section 207. The control section 202 monitors the states of the airbag sensor 26 and emergency signal button 27 to prepare for an emergency report communication process that is to be performed when the airbag sensor 26 outputs a control signal for airbag inflation or the emergency signal button 27 is pressed.

Under normal conditions in which neither the emergency report communication process nor theft report process is performed, the emergency report terminal device 21 performs a process for periodically generating the positional information about the vehicle and storing it. The control section 202 periodically transmits a positional information request signal to the positional information generation circuit 203. In accordance with the C/A code and P code acquired from a GPS satellite, the positional information generation circuit 203 acquires almanac data, ephemeris data, GPS time information, ionization correction parameters, and other data to calculate the satellite startup information, time information, and radio wave propagation delay time and determine the current location. Further, the positional information generation circuit 203 acquires an angular speed signal from the gyro sensor 204 and a speed signal from the vehicle speed signal generator 23 to calculate the relative displacement position and accurately determine the current location. The positional information generation circuit 203 outputs the current location data to the control section 202. The control section 202 records the acquired positional information in the storage section 207. When a certain amount of positional information is stored, the control section 202 erases the oldest positional information and continues to perform a process for recording the latest positional information. It is therefore possible to obtain the positional information about locations between the current location and a past location (travel history).

While a process for recording the latest positional information is being continuously performed, the emergency report terminal device 21 performs an emergency report communication process if it receives a signal indicating that the emergency signal button 27 is pressed by the user or receives a signal input from the airbag sensor 26, which indicates that the airbag is inflated. The control section 202 acquires the phone number of the emergency report center from the storage section 207 and uses the acquired phone number to perform a dialing process from the wireless communication section 201. The wireless communication section 201 performs a dialing process to call the center system 1 via the cellular phone communications provider 6 and fixed-line telephone communications provider 4.

The information transmitted from the emergency report terminal device 21 is received by the cellular phone communications provider 6 and entered into the modem 103 of the center system 1 via the fixed-line telephone communications provider 4. The modem 103 outputs a signal to indicate that an incoming phone call is received at the center terminal 102. Upon receipt of the incoming call, the center terminal 102 performs a telephone line connection process to establish a telephone line connection between the modem 103 and emergency report terminal device 21. Upon telephone line connection verification, the emergency report terminal device 21 transmits various items of information including the call origination conditions for the emergency report communication process, the registration information about the vehicle 2, the registration information about the emergency report terminal device 21, the current positional information, the past travel history, and the phone number of the cellular phone possessed by the user. The center terminal 102 acquires the information from the vehicle 2 via the modem 103. The center terminal 102 uses the registration information about the vehicle 2 and emergency report terminal device 21, which is transmitted from the emergency report terminal device 21, to search the database 104. If the information is registered in the database, the center terminal 102 determines, for instance, the name of the registrant, vehicle type, and vehicle color from the registered information. Further, the center terminal 102 acquires the map information about an area around the current location from the database 104 in addition to the current positional information and the information about the history of past travels, and displays the acquired map, the current location, and the plotted information about the travel history on the screen. The operator can determine the route traveled by the vehicle 2, which transmitted an emergency report, and the current location of the vehicle 2 by viewing the on-screen map.

The center system 1 dials the phone number of the user's cellular phone 28, which is transmitted from the emergency report terminal device 21, to acquire various information including the description of the accident, the number of persons affected by a sudden illness, and the number of injured persons. This telephone call origination process is performed by the operator of the center system 1. The operator views the display for the center terminal 102 to confirm the phone number for communication and performs dialing procedure at the telephone 101 to originate a call. An alternative is to let the center terminal 102 originate a call remotely and make a connection to the telephone 101. The operator of the center system 1 can establish voice communication with the user via the telephone 101 and cellular phone 28 to obtain various information including the description of the accident and the number of injured persons. The operator can convey various information, including the current location of the vehicle 2, which transmitted an emergency report, the description of the accident, and the number of injured persons, to a police department, fire department, or other rescue organization with a view toward initiating prompt rescue activities.

While the above emergency report is being made, the emergency report terminal device 21 uses the loudspeaker 24 and LED 25 to convey the descriptive information about the accident to the user. The user is therefore informed of the contents of the emergency report. The control section 202 issues instructions for preset message output to the loudspeaker sound control section 205. The loudspeaker sound control section 205 inputs the instructions for preset message output and exercises control for causing the loudspeaker 24 to generate an audible message. For example, the generated audible message may indicate that a dialing process is being performed to call the center system 1, indicate that a data communication process is being performed with the line connection to the center system 1 established, or indicate that the initiation of voice communication is to be awaited after completion of the data communication process. The emergency report terminal device 21 can selectively generate an appropriate audible message depending on the situation, thereby allowing the user to acquire detailed information about the situation. In a situation where information is to be transmitted to indicate that the initiation of voice communication is awaited, an audible message can be generated to indicate that the center system 1 places a phone call to the user's phone number. This enables the user to switch to an incoming call wait state and proceed to establish proper voice communication. The control section 202 also outputs a steady/blinking light control signal for the LED 25 to the illumination control section 206. Before an emergency report is made, steady green light is emitted to indicate an ongoing operation. When an emergency report communication process starts, however, the steady green light turns to blinking green light to indicate that the emergency report communication process is being performed.

Cellular phone number registration from the cellular phone 28 will now be described. With a hard-wired or wireless connection established between the emergency report terminal device 21 and cellular phone 28, the emergency report terminal device 21 outputs a signal that requests the phone number of the cellular phone 28. In response to the request signal, the cellular phone 28 transmits its phone number (local phone number). The emergency report terminal device 21 then acquires the phone number of the cellular phone 28 and registers it in the storage section 207. In general, a hard-wired connection is established between the emergency report terminal device 21 and cellular phone 28. In this instance, a serial signal is used for request signal output and local phone number acquisition. If, on the other hand, a wireless connection is used instead of a hard-wired connection, various processes including those for connection verification and negotiation are first performed to verify that the wireless connection is established, and then the processes including those for phone number request and local phone number acquisition are performed. Wireless communication can be established by use of the IrDA, Bluetooth, or other wireless communication technology.

Figure 3:
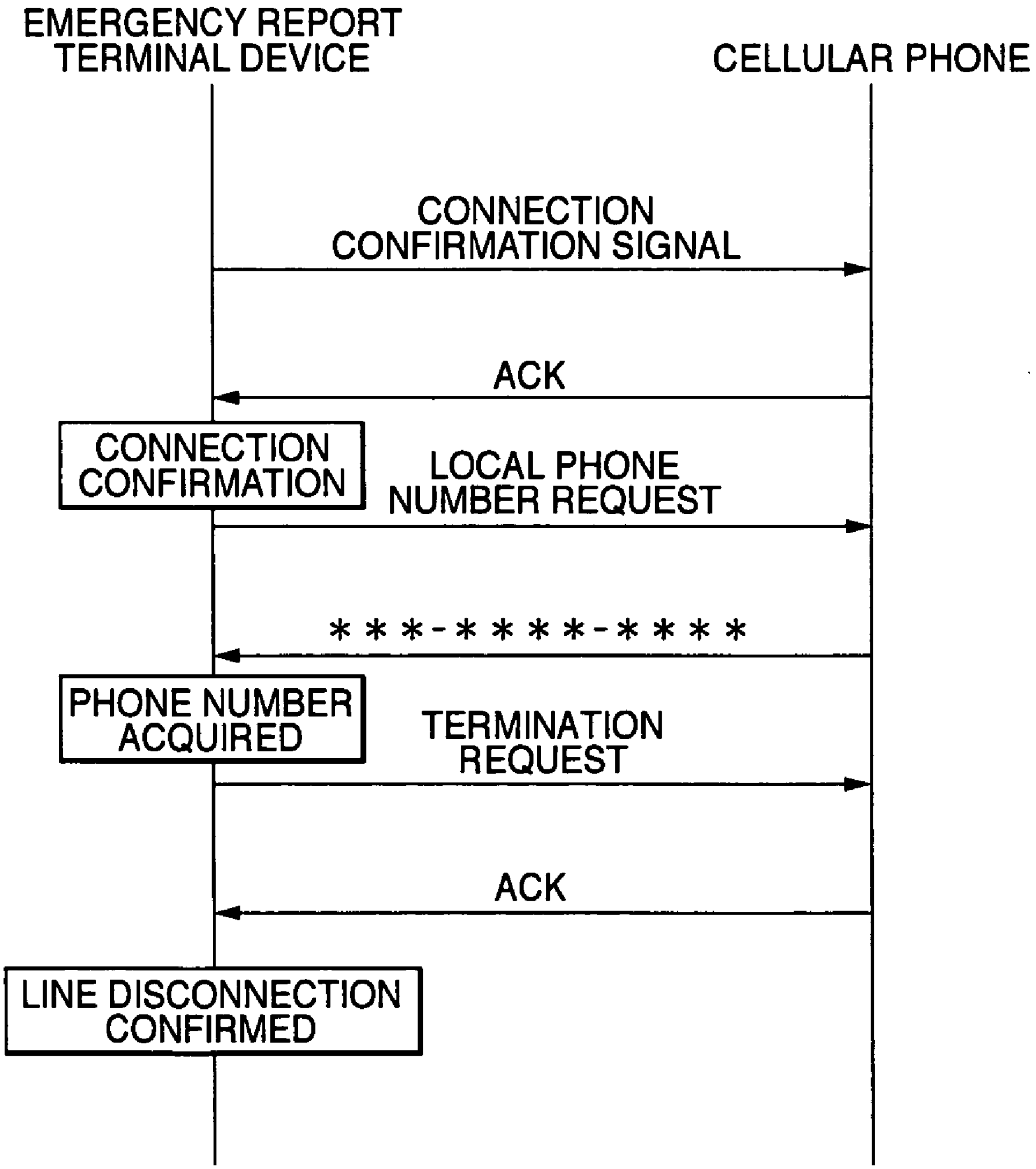
FIG. 3 is a diagram illustrating a sequence that is followed when the emergency report terminal device according to the above embodiment acquires a phone number from a cellular phone.

FIG. 3 shows a typical process that the emergency report terminal device 21 performs to acquire the phone number from the cellular phone 28. When the user goes into the accessory power supply state or the ignition power supply state in order to start the engine, the control section 202 outputs a signal to the cellular phone 28 in order to request the local phone number with the connection to the emergency report terminal device 21 established. The emergency report terminal device 21 transmits a confirmation signal (connection confirmation signal) to the cellular phone 28 in order to check whether the line connection is established. Upon receipt of the confirmation signal, the cellular phone 28 returns a response signal ACK, which indicates that the confirmation signal is received normally. The emergency report terminal device 21 then verifies that the cellular phone 28 is connected. If the emergency report terminal device 21 does not receive ACK, it performs a retry operation to continue with the connection verification process. If the line connection is not established through a predetermined number of retries or for a predetermined period of time, it is concluded that an abnormality exists. Such an abnormality is then reported to the user, for instance, by causing the LED 25 to perform a steady illumination/blinking process or the loudspeaker 24 to perform a sound generation process. It is preferred, for example, that the LED 25 emit a red blinking light for abnormality indication. The loudspeaker 24 generates an audible message that prompts for the connection of the cellular phone 28 or indicates the failure to establish the normal connection for the purpose of notifying the user that the cellular phone 28 cannot normally be connected. When the connection is verified normally, the emergency report terminal device 21 outputs a signal to request the local phone number of the cellular phone 28. Since the cellular phone 28 uses serial communication or other similar means to transmit the local phone number, the emergency report terminal device 21 can transmit the local phone number to the center system 1 during an emergency report communication process. If the emergency report terminal device 21 cannot normally acquire the local phone number or the acquired phone number contains an excessively large or small number of digits or is otherwise abnormal, the LED 25 and loudspeaker 24 are used to notify the user of such an abnormality. When the local phone number is acquired, the emergency report terminal device 21 records the acquired local phone number in the storage section 207 and performs a process for transmitting the local phone number during the emergency report communication process. When, for instance, the vehicle power is turned ON, the emergency report terminal device 21 performs a local phone number acquisition process and stores the local phone number of the cellular phone 28. The emergency report terminal device 21 retains the acquired local phone number until the power turns OFF. When the emergency report terminal device 21 performs the emergency report communication process, it transmits the local phone number to the center system 1.

The advantages provided by the foregoing embodiment of the present invention will now be described. The emergency report terminal device according to the present invention transmits the vehicle's unique number, the emergency report terminal device's unique number, the current positional information, the date/time of current positional information acquisition, the information about the route traveled by the vehicle, the dates/times of traveled route point recordings, and the emergency report communication process at the time of data transfer during the emergency report communication process. It is therefore possible to determine the vehicle from which the information about a traffic accident or sudden illness was reported, the owner of the vehicle, and the location of emergency report transmission. In addition, the data about a phone number other than that of the telephone used for placing a call to the emergency report center is transferred to the emergency report center so that the emergency report center can call the transferred other phone number to obtain the information about persons affected by a sudden illness, the number of injured persons, and the descriptions of injuries and accident. As a result, smooth and appropriate rescue activities can be conducted. Further, as the above-mentioned other phone number, the phone number of the user's cellular phone can be determined by operating the user's operating control buttons to perform a phone number input process for the cellular phone possessed by the user or by performing a local phone number acquisition process for the user's cellular phone with a hard-wired or wireless connection made to the cellular phone. This makes it possible to obtain the phone number of the user's cellular phone. The emergency report center dials a call to the phone number of the cellular phone to properly establish voice communication with the user who made an emergency report. In addition, it is not necessary to add a voice communication circuit to a wireless communication device or emergency report terminal device mounted in the vehicle. Since the employed circuit is simplified in this manner, it is possible to reduce the size and cost of the emergency report terminal device. Further, when the contract to be signed with a cellular phone communications provider is limited to a data communication process, the basic charge to be paid to the communications provider is lower than in a case where voice communication is provided. Furthermore, even when the user leaves the vehicle due to a certain circumstance, the emergency report center can establish voice communication with the user.

The emergency report terminal device according to the present invention also transfers to the emergency report center the data including the data about a phone number other than that is used for the emergency report call origination process as well as the vehicle's unique number, the emergency report terminal device's unique number, the current positional information, the date/time of current positional information acquisition, the information about the route traveled by the vehicle, the dates/times of traveled route point recordings, and the information about one or more causes of triggering an emergency report communication process. A wireless communication device for performing the emergency report communication process is mounted in the vehicle to perform an emergency report process instantly in the event of an emergency and transmit the vehicle's unique number and the emergency report terminal device's unique number. Therefore, the vehicle from which the emergency report was transmitted can be identified. Further, the positional information and other information are transmitted so that the vehicle's location can be identified. Furthermore, when the emergency report center needs to obtain the detailed information about the accident and sudden illness, a telephone call can be placed to the cellular phone possessed by the user to establish voice communication and acquire the information about the emergency. In addition, the wireless communication device and emergency report terminal device mounted in the vehicle incorporate a data communication function only. As the system is simplified in this manner, it is possible to reduce the size and cost of the system. Further, the wireless communication device mounted in the vehicle can be limited to a data communication service by means of a contract so that the basic charge to be paid to the communications provider is lower than in a case where voice communication is provided.

The emergency report terminal device according to the present invention also transmits the phone number data entered from the outside of the emergency report terminal device to the emergency report center. Since the emergency report terminal device is equipped with an input section, the user can enter the phone number of a cellular phone, if it is possessed by the user, to perform an emergency report call origination process and send a request to a rescue organization. When the emergency report center is to establish voice communication in order to obtain the information about the emergency, it is possible to obtain the information about the emergency situation by directly calling the user's cellular phone, which is a device other than the wireless communication device used for emergency report transmission.

Further, the emergency report terminal device according to the present invention is such that the user preregisters a phone number and transmits the data about the phone number to the emergency report center. Since means for registering the phone number of a cellular phone before emergency report transmission is provided, the user can enter the phone number of a cellular phone, if it is possessed by the user, while the user is in the vehicle or in some other normal state. When the user sends a request to a rescue organization during an emergency report call origination process, the user does not have to state the phone number in a chaotic situation prevalent at the time of emergency reporting. Further, when the emergency report center establishes voice communication to obtain the information about the emergency, the emergency report center can acquire the information about the emergency situation by directly calling the preregistered cellular phone of the user.

The emergency report terminal device according to the present invention also includes data input means for allowing the user to enter a phone number. Since an input section and a function for preregistering a phone number are incorporated, the user can enter the phone number of a cellular phone in advance, if it is possessed by the user, while the user is in the vehicle or in some other normal state. When the user sends a request to a rescue organization during an emergency report call origination process, the user does not have to enter the phone number in a chaotic situation prevalent at the time of emergency reporting. Further, when the emergency report center establishes voice communication to obtain the information about the emergency, the emergency report center can acquire the information about the emergency situation by directly calling the preregistered cellular phone of the user.

The emergency report terminal device according to the present invention, which performs an emergency report communication process, also includes means for acquiring the phone number of a cellular phone possessed by the user and transmits the data about the user's cellular phone and its phone number to the emergency report center. Since the means for acquiring the phone number of a cellular phone possessed by the user is incorporated, the emergency report terminal device performs a process for acquiring the phone number of a cellular phone, if it is possessed by the user. This ensures that when an emergency report call origination process is performed to send a request to a rescue organization, the user does not have to enter the phone number and perform a phone number notification process in a chaotic situation prevalent at the time of emergency reporting. Further, when the emergency report center is to establish voice communication to obtain the information about the emergency, the emergency report center can acquire the phone number of the user's cellular phone and perform a call origination process to establish voice communication for the purpose of obtaining the information about the emergency situation.

The emergency report terminal device according to the present invention, which performs an emergency report communication process, also includes means for detecting the connection of a cellular phone of the user and acquiring the phone number of the cellular phone, and transmits the data about the recorded phone number to the emergency report center after the cellular phone number is acquired during an emergency report communication process. When a hard-wired or wireless connection is made to a telephone possessed by the user and means for acquiring the phone number of the user's cellular phone is incorporated, the emergency report terminal device performs a process for acquiring the phone number of a cellular phone, if it is possessed by the user. This ensures that when an emergency report call origination process is performed to send a request to a rescue organization, the user does not have to enter the phone number and perform a phone number notification process in a chaotic situation prevalent at the time of emergency reporting. Further, when the emergency report center is to establish voice communication to obtain the information about the emergency, the emergency report center can acquire the information about the emergency situation by performing a call origination process to dial the phone number of the user's cellular phone.

The emergency report terminal device according to the present invention, which performs an emergency report communication process, also acquires a phone number from a cellular phone when the vehicle's accessory power or ignition power turns ON. When the user carries a cellular phone into the vehicle and turns ON the vehicle's accessory power and ignition power to start the engine, the hard-wired or wireless connection to the cellular phone is verified and a phone number acquisition process is performed. Since the phone number is already acquired at the time of power turn-ON, the user does not have to enter and transmit the phone number in a chaotic situation prevalent at the time of emergency reporting when an emergency report call origination process is performed to send a request to a rescue organization. Further, when the emergency report center is to establish voice communication to obtain the information about the emergency, the emergency report center can acquire the information about the emergency situation by performing a call origination process to dial the phone number of the user's cellular phone.

The emergency report terminal device according to the present invention, which performs an emergency report communication process, also acquires a phone number from a cellular phone when the vehicle becomes ready for moving or begins to move. When the user carries a cellular phone into the vehicle and begins to move the vehicle, the hard-wired or wireless connection to the cellular phone is verified and a phone number acquisition process is performed. Since the phone number is already acquired when the vehicle begins to move, the user does not have to enter and transmit the phone number in a chaotic situation prevalent at the time of emergency reporting when an emergency report call origination process is performed to send a request to a rescue organization. Further, when the emergency report center is to establish voice communication to obtain the information about the emergency, the emergency report center can acquire the information about the emergency situation by performing a call origination process to dial the phone number of the user's cellular phone.

The emergency report terminal device according to the present invention, which performs an emergency report communication process, also acquires a phone number from a cellular phone when an emergency report communication process starts. When the user carries a cellular phone into the vehicle, the hard-wired or wireless connection to the cellular phone is verified. Further, when an emergency report call origination process is performed to send a request to a rescue organization, the emergency report terminal device performs a process for acquiring a phone number from the cellular phone that is carried into the vehicle by the user. As a result, the user does not have to enter and transmit the phone number in a chaotic situation prevalent at the time of emergency reporting. In addition, when the emergency report center is to establish voice communication to obtain the information about the emergency, the emergency report center can acquire the information about the emergency situation by performing a call origination process to dial the phone number of the user's cellular phone.

The emergency report terminal device according to the present invention, which performs an emergency report communication process, also achieves data acquisition to acquire the data about a phone number from the user's cellular phone while the cellular phone is connected with a conducting wire to a device that performs the emergency report communication process. When, for instance, the cellular phone carried into the vehicle by the user is hard-wire connected, the vehicle's power is turned ON, or the emergency report communication process is initiated, the process for acquiring the phone number from the cellular phone is performed. Therefore, the user does not have to enter and transmit the phone number in a chaotic situation prevalent at the time of emergency reporting. Further, when the emergency report center is to establish voice communication to obtain the information about the emergency, the emergency report center can acquire the phone number of the user's cellular phone, which is hard-wire connected, and obtain the information about the emergency situation by performing a call origination process to dial the phone number.

The emergency report terminal device according to the present invention, which performs an emergency report communication process, also achieves data acquisition to acquire the data about a phone number from the user's cellular phone while the cellular phone is wirelessly connected to a device that performs the emergency report communication process. When, for instance, the cellular phone carried into the vehicle by the user is wirelessly connected, the vehicle's power is turned ON, or the emergency report communication process is initiated, the process for acquiring the phone number from the cellular phone is performed. Therefore, the user does not have to enter and transmit the phone number in a chaotic situation prevalent at the time of emergency reporting. Further, when the emergency report center is to establish voice communication to obtain the information about the emergency, the emergency report center can acquire the phone number of the user's cellular phone, which is wirelessly connected, and obtain the information about the emergency situation by performing a call origination process to dial the phone number.

The emergency report terminal device according to the present invention also includes means for notifying the user of the inability to acquire a phone number from the user's cellular phone if such a phone number cannot be acquired. If the mounted wireless communication device and emergency report terminal device are without a voice communication circuit or if the contract signed with a communications provider does not provide voice communication during the use of a cellular phone, data communication can be effected, for instance, to transmit positional information, but no voice communication can be established. Therefore, the user is notified that the cellular phone is not connected. As a result, if, for instance, the user inadvertently leaves the cellular phone unconnected, the user can be prompted to connect the cellular phone for the purpose of properly establishing voice communication with the emergency report center at the time of emergency reporting.

If a phone number cannot be acquired from the user's cellular phone, the emergency report terminal device according to the present invention notifies the user of the inability to acquire a phone number from the user's cellular phone by performing at least one of a beep generation, preset audible message generation, or other sound generation process, an LED steady/blinking light emission process, and an LCD-based display process. If the mounted wireless communication device and emergency report terminal device are without a voice communication circuit or if the contract signed with a communications provider does not provide voice communication during the use of a cellular phone, data communication can be effected, for instance, to transmit positional information, but no voice communication can be established. Therefore, a beep generation, preset audible message generation, or other sound generation process, an LED steady/blinking light emission process, or an LCD-based display process is performed to notify the user that the cellular phone is not connected. As a result, if, for instance, the user inadvertently leaves the cellular phone unconnected, the user can be prompted to connect the cellular phone for the purpose of properly establishing voice communication with the emergency report center at the time of emergency reporting.

The emergency report system according to the present invention includes an emergency report terminal device for transmitting positional information and other data to an emergency report center in the event of a traffic accident or sudden illness, the user's cellular phone for establishing voice communication in response to an incoming phone call from an emergency report center, and an emergency report center for determining the situation according to the positional information transmitted from the emergency report terminal device and the contents of voice communication, and requesting a rescue organization to dispatch a rescue vehicle. The emergency report terminal device, which is included in the system configuration, incorporates a function for acquiring the phone number of a cellular phone possessed by the user and is constructed without a voice circuit in order to reduce the size and cost. The emergency report center, which is also included in the system configuration, identifies the contents of the data transmitted from the emergency report terminal device, determines the phone number of the user's cellular phone, which is included in the transmitted data, and performs a call origination process to establish voice communication for the purpose of acquiring the information about the emergency situation. As regards voice communication, a system based on the user's cellular phone can be configured. As a result, it is possible to reduce the size and cost of the emergency report terminal device. In addition, the cost to be paid by the user can be decreased because the contract to be signed with a communications provider can be limited to data communication.

In the event of a traffic accident or sudden illness, the emergency report terminal device within the emergency report system according to the present invention transmits to the emergency report center the phone number of a wireless communication device other than that is used to perform the emergency report communication process. The emergency report center performs a call origination process by use of the transmitted phone number of the other wireless communication device, and establishes voice communication with the user to obtain the information about the accident or other emergency. The emergency report terminal device, which is included in the system configuration, incorporates a function for acquiring the phone number of a cellular phone possessed by the user and is constructed without a voice circuit in order to reduce the size and cost. The emergency report center, which is also included in the system configuration, identifies the contents of the data transmitted from the emergency report terminal device, determines the phone number of the user's cellular phone, which is included in the transmitted data, and performs a call origination process to establish voice communication for the purpose of acquiring the information about the emergency situation. As regards voice communication, a system based on the user's cellular phone can be configured. As a result, it is possible to reduce the size and cost of the emergency report terminal device. In addition, the cost to be paid by the user can be decreased because the contract to be signed with a communications provider can be limited to data communication.

Furthermore, the emergency report system according to the present invention includes a wireless communication device, which performs a call origination process with a cellular phone network at the time of emergency report communication processing; a cellular phone possessed by the user; an emergency report terminal device, which acquires a phone number from the cellular phone, stores the acquired phone number, performs a call origination process to call an emergency report center with the wireless communication device at the time of emergency report communication processing, and transmits the acquired phone number of the user's cellular phone to the emergency report center upon line connection establishment; and the emergency report center, which determines the vehicle's location from positional information acquired from the emergency report terminal device, performs a call origination process to call the acquired phone number of the user's cellular phone, and establishes voice communication to obtain the information about the situation. Consequently, the emergency report terminal device, which is included in the system configuration, acquires the phone number of the cellular phone possessed by the user and is constructed without a voice circuit in order to reduce the size and cost. The emergency report center, which is also included in the system configuration, identifies the contents of the data transmitted from the emergency report terminal device, determines the phone number of the user's cellular phone, which is included in the transmitted data, and performs a call origination process to establish voice communication for the purpose of acquiring the information about the emergency situation. As regards voice communication, a system based on the user's cellular phone can be configured. As a result, it is possible to reduce the size and cost of the emergency report terminal device. In addition, the cost to be paid by the user can be decreased because the contract to be signed with a communications provider can be limited to data communication.

As described above, the emergency report terminal device according to the present invention uses simplified wireless communication means to reduce the size and cost. Further, even when the vehicle from which an emergency report has been transmitted is endangered and the user has to stay away from the vehicle, the emergency report terminal device can establish proper voice communication between the user and the emergency report center.

While the present invention has been described in conjunction with a preferred embodiment that is illustrated in the accompanying drawings, it should be understood that modifications will become apparent to those of ordinary skill in the art and that such modifications are intended to be included within the scope of the invention and the following claims.

What is claimed is:

1. An emergency report system, comprising:

an emergency report terminal device mounted in a vehicle, the terminal device being configured to perform an emergency report communication process via a cellular phone network, the communications process being configured to call an emergency report center in the event of an emergency, to transfer positional information about said vehicle, and to establish voice communication to convey the information about the emergency;

wherein said emergency report terminal device includes built-in wireless communication means for performing said emergency report communication process and control means for transmitting a phone number of a cellular phone, not in communication with said emergency report terminal device, to said emergency report center when data is transmitted by said built-in wireless communication means, and said emergency report center uses the phone number of said cellular phone, which is transmitted from said emergency report terminal device, to place a call directly to said cellular phone and establish voice communication to obtain the information about a situation in which an emergency report has been made to thereby establish communications by said built-in wireless communication means and said cellular phone.

2. The emergency reporting system of claim 1, wherein the emergency report terminal device comprises a storage section storing therein the phone number of said cellular phone.

3. The emergency reporting system of claim 1, further comprising a portable cellular phone not electrically connected to the emergency report terminal device.

4. The emergency reporting system of claim 3, further comprising control means for transmitting a phone number of the cellular phone to said emergency report center when data is transmitted by said built-in wireless communication means.

5. The emergency report terminal device of claim 1, wherein said emergency terminal device further includes an emergency signal button for actuating the wireless communicating means to call the emergency report center through the built-in wireless communication means.

* * * * *